United States Patent
Shackelford

(10) Patent No.: US 6,935,068 B2
(45) Date of Patent: Aug. 30, 2005

(54) FISH ALARM AND LINE RELEASE DEVICE

(75) Inventor: Robert Shackelford, 519 Maplewood, Struthers, OH (US) 44471

(73) Assignee: Robert Shackelford, Struthers, OH (US)

( * ) Notice: Subject to any disclaimer, the term of this patent is extended or adjusted under 35 U.S.C. 154(b) by 232 days.

(21) Appl. No.: 09/995,627

(22) Filed: Nov. 29, 2001

(65) Prior Publication Data

US 2003/0097779 A1 May 29, 2003

(51) Int. Cl.[7] .......................... A01K 87/00; A01K 97/12
(52) U.S. Cl. ............................................... 43/25; 43/17
(58) Field of Search ................... 43/17, 25; 248/309.4; 269/8

(56) References Cited

U.S. PATENT DOCUMENTS

| | | | | |
|---|---|---|---|---|
| 3,499,242 A | * | 3/1970 | Tucker ........................... | 43/25 |
| 3,521,393 A | * | 7/1970 | Gordon .......................... | 43/17 |
| 3,963,229 A | * | 6/1976 | Van Duynhoven ............. | 269/8 |
| 4,030,223 A | * | 6/1977 | Loesch et al. ................. | 43/15 |
| 4,038,772 A | * | 8/1977 | Mihaly et al. ................. | 43/17 |
| 5,058,308 A | * | 10/1991 | Girard ........................... | 43/17 |
| 5,207,015 A | * | 5/1993 | Kvarnstrom ................... | 43/25 |
| 5,430,968 A | * | 7/1995 | Watkins et al. ................ | 43/25 |
| 5,771,624 A | * | 6/1998 | Vickery et al. ................ | 43/17 |

* cited by examiner

Primary Examiner—Kurt Rowan
(74) Attorney, Agent, or Firm—Robert G. Lev

(57) ABSTRACT

An improved fish bite alarm and fishing line release device that provides immediate release of a fishing line and activation of a fish bite alarm due to the use of spring biasing. The line holding and release device preferably includes two fingers arranged for holding the fishing line, a spring bias means for triggering the release of the line, an alarm circuit, and a spring bias means for activating the alarm circuit.

4 Claims, 3 Drawing Sheets

FISH ALARM AND LINE RELEASE DEVICE

FIELD OF THE INVENTION

The present invention generally relates to a fish bite alarms. More specifically, the system includes a device that releases the fishing line completely from its grasp due responsive to tension from a fish bite on the fishing line.

BACKGROUND OF THE INVENTION

Fisherman have long used many devices to hold fishing lines, and to alert fishermen of fish bites on fishing lines. As a result, there have been numerous inventions and modifications in the field of fish bite alarms, as well as devices to hold and then release fishing lines. However, these devices do not address the dilemma of alerting the fisherman that a fish has bitten without simultaneously alerting the fish itself. The most common cause of this problem in conventional devices is that the fishing line requires a significant pull (and in some cases a double pull) on it in order to operate the tension necessary to release it from the line holding device, thereby allowing the fishing reel to spin freely. That increases tension is often all a fish needs to realize that a danger is present, and the fish reacts accordingly.

Thus, there is a clear need for a fishing line holding device which does not require a strong pull to release the line so that the fish is not alerted to danger. A line holding device which provides an immediate, tangle-free release is also needed. Only a small tension on the line should be required in order to release the line from the grasp of the holding device. Also, since fishing environments can greatly vary, it is also desirable to provide tension control on the line holding device. In this way line tension can be adjusted to best suit the particular circumstances in which the fishing is carried out.

SUMMARY OF THE INVENTION

Accordingly, it is a first object of the present invention to overcome the drawbacks of the conventional art.

It is another object of the present invention to provide a fish bite alarm and fishing line release device that is more adaptable than in the conventional art.

It is a further object of the present invention to provide a fish bite alarm and fishing line release device that requires only a single, extremely slight tug on the fishing line in order to release the fishing line and activate the alarm.

It is an additional object of the present invention to provide a fish bite alarm and fishing line release device that does not require multiple tugs on the fishing line so that the fish will not shy from the line and hook.

It is still a further object of the present invention to provide a fish bite alarm and fishing line release device that does not require substantial tension upon the fishing line to release the fishing line held within the fishing line release device.

It is still another object of the present invention to provide a fish bite alarm and fishing line release device that ensures immediate tangle-free release of the fishing line.

It is again a further object of the present invention to provide a fish bite alarm and fishing line release device that completely frees the fishing line upon the occurrence of very little tension on the line.

It is still an additional object of the present invention to provide a fish bite alarm and fishing line release device that remains disengaged after the device is triggered.

It is yet a further object of the present invention to provide a fish bite alarm and fishing line release device with an alarm signal that can be activated before a fish realizes that it has been hooked.

It is also another object of the present invention to provide a fish bite alarm and fishing line release device with an alarm that remains active after triggering until manually deactivated.

It is still a further object of the present invention to provide a fish bite alarm and fishing line release device that is simple to operate.

It is again another object of the present invention to provide a fish bite alarm and fishing line release device that is easily attachable to a variety of fishing rods.

It is yet an additional object of the present invention to provide a fish bite alarm and fishing line release device that can be used with different fishing rods and fishing reels, without tangling the fishing line or hindering the reel.

It is also a further object of the present invention to provide a fish bite alarm and fishing line release device or which line tension can be carefully calibrated.

It yet an additional object of the present invention to provide a fish bite alarm and fishing line release device contained within a compact housing, and designed so that it provides minimal additional weight or volume to the fishing rod.

These and other goals and objects of the present invention are achieved by a fish bite alarm and fishing line release device, which is operable in conjunction with a fishing reel that contains the fishing line. The device includes two fingers arranged to hold the fishing line when in a closed position. It also includes an apparatus for opening the fingers when tension is applied to the fishing line.

In another embodiment, the fishing line release device is operable in conjunction with a fishing reel that contains the fishing line. The device includes a holding device for holding the fishing line. It also includes a spring bias mechanism for triggering the release of the fishing line from the holding device.

In a further embodiment, the fish bite alarm and fishing line device is operable in conjunction with a fishing reel that contains the fishing line. The device includes an alarm circuit. It additionally includes a spring bias mechanism for removing an insert from the alarm circuit, thereby activating the alarm circuit.

DESCRIPTION OF THE PREFERRED EMBODIMENTS

Figure 1:
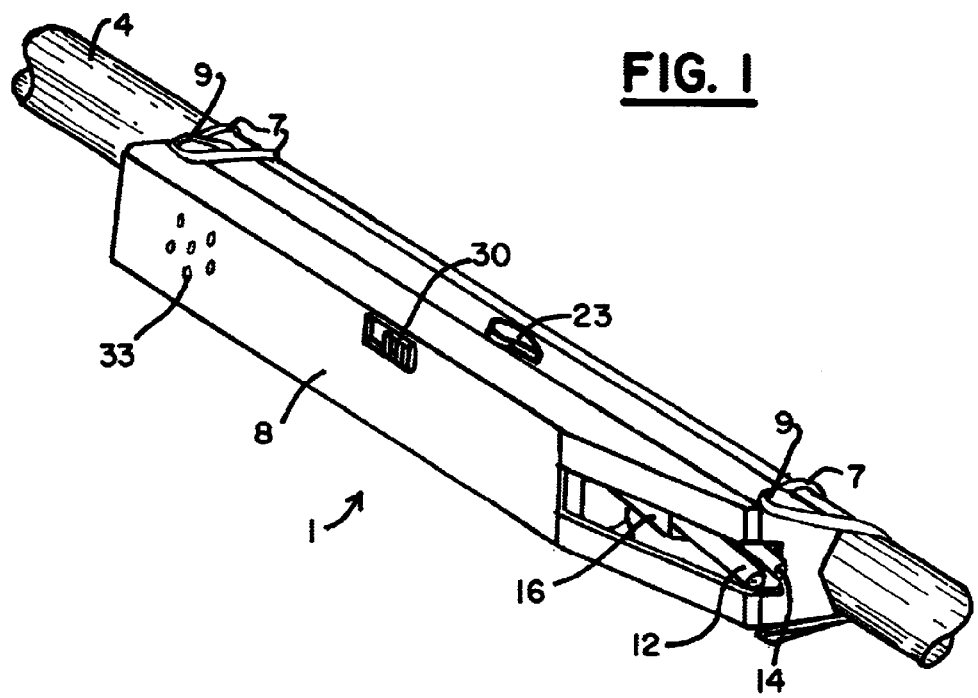
FIG. 1 is a perspective view of the invention attached to a fishing rod after it has released a fishing line.

The following description provides a detailed explanation of how the present invention achieves the stated objects. As shown in FIG. 1, the device 1 of the invention is completely contained within a housing structure 8. The compactness of the invention allows for ease of transport as well as ease of attachment to fishing rod 4. The housing 8 is attached to a fishing rod 4 simply by using elastic bands 7 that hook onto corner protrusions 9 of the housing.

Figure 2:
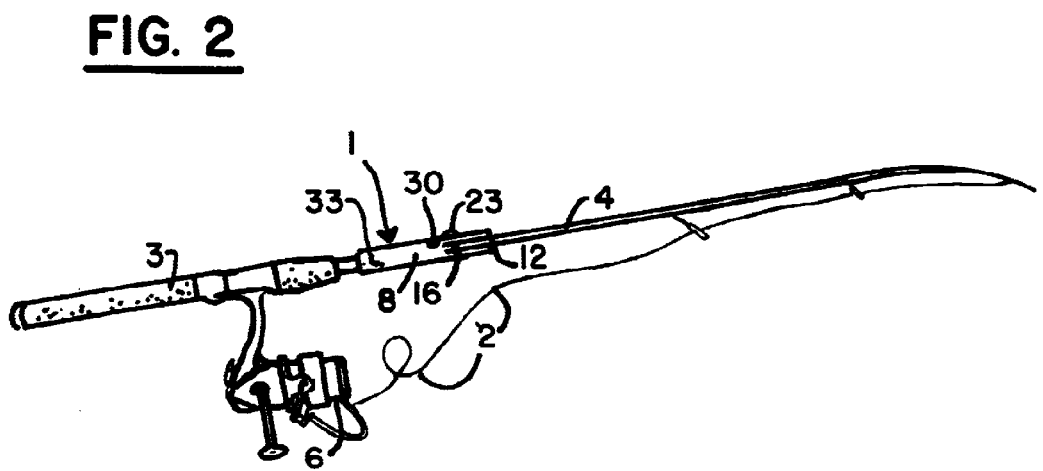
FIG. 2 is a side view of the invention depicting the entire fishing rod and fishing reel after it has released a fishing line.
Figure 3:
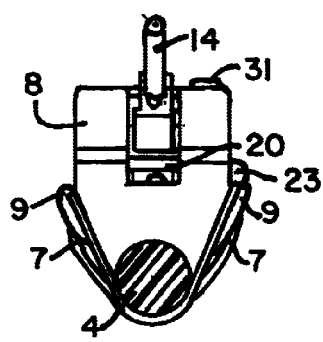
FIG. 3 is a front sectional view of the invention while in the engaged mode.

FIG. 2 depicts one arrangement in which the invention can be optimally placed close to the handle 3 of fishing rod 4 so that housing 8 is easily reached by a user. This position also affords the capability of attaching the fishing line 2 to the device 1 without pulling the line far from its natural relaxed position. Further, the small size and streamlined shape of device 1 preventing it from entangling the line 2 during the release or extension of the fishing line 2 from the reel 6.

Figure 4:
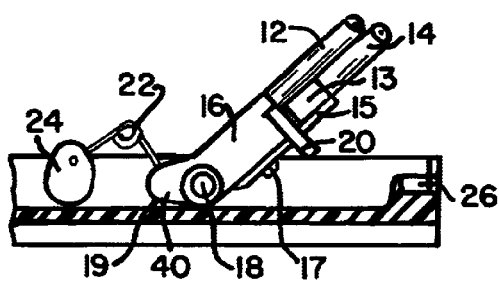
FIG. 4 is a side sectional view of the invention while in the engaged mode.

The fishing line 2, when engaged by device 1, is held between two fingers 12, 14. In one preferred embodiment, as depicted in FIG. 4, a plastic finger 12 and a ferrous metal finger 14 are used. The plastic finger 12 is rigidly attached to a rotating structure 16. the metal finger 14 is also attached to structure 16, next to Finger 12. However, ferrous metal finger 14 is hinged. This is accomplished using a cylindrical clasp 13 on the base of the ferrous metal finger 14. Clasp 12 is attached to a metal strip 15. The metal strip 15 is joined by a screw 17 to the side of the same rotating structure 16 to which the plastic finger 12 is rigidly attached. The capability of separating fingers 12 and 14 helps to insure that they will be easily separated at the moment of triggering. Also attached to the rotating structure next to the base of the fingers 12, 14, is a stop 20.

Figure 5:
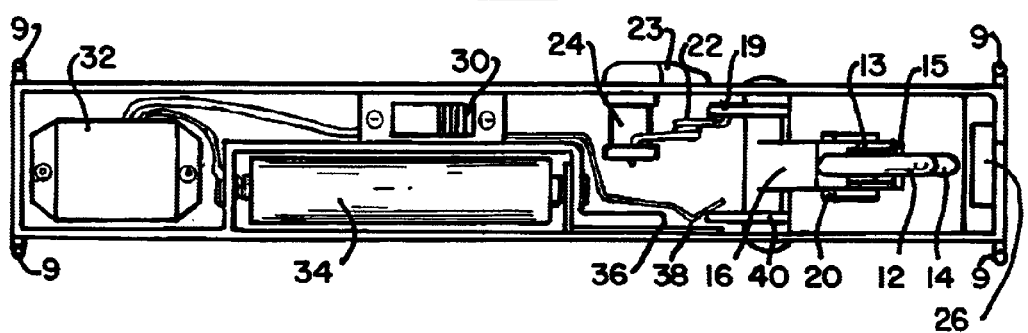
FIG. 5 is a top sectional view of the invention while in the engaged mode.

As depicted in FIG. 5, extending from the edge of the rotating structure 16 is an extension piece 19, which itself is attached to one end of spring 22. This spring 22 is connected at its other end to an adjustment structure 24. This structure 24 can be rotated by an external knob 23 for adjusting the tension on spring 22. The capability to adjust tension on spring 22 allows the selection of the tension necessary to trip the device 1 to be done very precisely. This adjustment feature makes the invention useful for different types of fishing, such as drift or still fishing.

On the other end of the rotating structure 16, as depicted in FIG. 5, is another extension 40. This extension is placed as an insert between one conductor 36 that is flat against the housing of the invention and a second conductor 38 that is flexibly attached to an alarm switch 30. That the extension 40 and the fingers 12, 14 are controlled by the same rotating structure 16, and ensures that the alarm 32 will be activated simultaneously with the release of the fishing line 2. The flat conductor 36 is connected to a battery 34. This battery is connected through conductors 36 and 38 to the electronic alarm device 32. The alarm switch 30 can be operated to cut off alarm device 32. Alarm switch 30 is accessible through a hole in the invention's housing 8.

In one preferred embodiment, the invention's housing 8 has a series of holes above the alarm device 32 in order to pass the sound clearly when triggered. Alternative alarm devices may also include flashing lights, vibrators, buzzers, bells, or any other type of aural or visual signal. There can also be variations in sound, with such alternatives as a constant tone, intermittent tone, or variable pitch. The alarm device 32 is connected to the alarm switch 30, thus completing the circuit.

In operation, once the spring's 22 tension has been set, the fingers 12, 14 can be rotated towards the engaged position as seen in FIG. 4. When the rotating structure 16 is moved towards the engaged position, the plastic finger 12 and ferrous metal finger 14 extend themselves outside of the invention's housing 8. During the same rotation of structure 16, the insert 40 is automatically placed between the flexible conductor 38 and immobile conductor 36 by the rotating action of structure 16. The fishing line is manually placed between the plastic finger 12 and ferrous metal finger 14.

Figure 6:
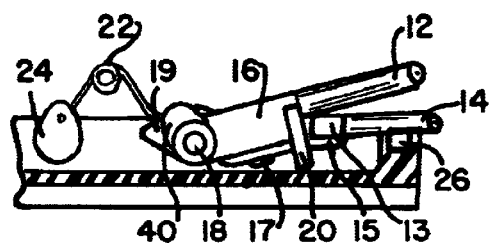
FIG. 6 is a side sectional view of the invention while in the disengaged mode.
Figure 7:
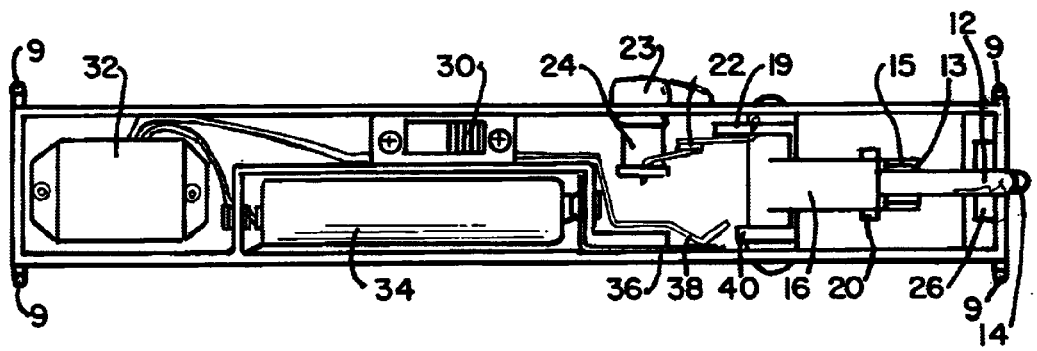
FIG. 7 is a top sectional view of the invention while in the disengaged mode.

When a fish first touches the fishing line 2 or a hook attached thereto a tension is applied to the line. The appropriate tension (as selected by the adjustment of spring 22) on the line is sufficient to force the rotating structure 16 to return to its disengaged position, as depicted in FIG. 6. The rotation is halted by the stop 20 hitting the inner wall of the invention. This prevents the plastic finger 12 from further movement. The ferrous metal finger 14, however, is attracted by a magnet 26 attached to the wall of the invention. This attraction helps the metal finger 14 to continue rotating until it connects with the stationary magnet 26. This separation of the fingers 12,14 quickly releases the fishing line 2 from their grasp. Simultaneous with the release of the fishing line 2 is the rotation of the insert 40. When the insert 40 is drawn away from its engaged position, the flexible conductor 38 is spring biased to make contact with the immobile conductor 36, completing the alarm circuit. The alarm 32 preferably remains on until manually disabled to ensure that the user is actively aware of the device 1 triggering.

In an alternative embodiment only a single finger need be used if positioned with the proper reel bail setting. In this embodiment the fishing line 2 is looped about the single finger, and the rotation of structure 16 allows the fishing line to slip off without undue tension on the line. In another arrangement using a single finger with an open reel bail, the line will slip off the finger with no rotation of 16. The use of a magnet is similarly part of a preferred embodiment, but not necessarily required for all versions of the present invention.

While the present invention has been described with reference to certain specific embodiments, it should be clear that these are only examples, and the present invention is not limited thereto. Accordingly, the present invention should be construed to include any and all variations, modifications, adaptions, and embodiments, or equivalents that would occur to one skilled in the art, once having appreciated the present application. Therefore, the present invention should be limited only by the scope of the appended claims.

I claim:

1. A fishing line release device, operable in conjunction with a fishing reel containing said fishing line, said fishing line release device comprising:

(a) two fingers arranged for holding said fishing line when in a closed position, and to rotate together in said closed position, one of said fingers being ferrous metal; and, (b) means for opening said fingers to release said fishing line when tension is applied to said fishing line, said means for opening comprising at least one stationary magnet to draw said ferrous metal finger to said stationary magnet, and a stop to separate said fingers;

(c) wherein said means for opening comprise a rotating structure for moving said fingers; and, (d) wherein said means for opening further comprise a spring bias means which moves said rotating structure.

2. The fishing line release device as claimed in claim 1, wherein said stationary magnet is positioned to attract a closer one of said fingers.

3. The fishing line release device of claim 1, fishing line release device is attached to a fishing rod mounting said fishing reel.

4. The fishing line release device of claim 1, further comprising a fish bite alarm triggered when said fishing line is released.

* * * * *